US012608194B2

(12) United States Patent
Tao et al.

(10) Patent No.: US 12,608,194 B2
(45) Date of Patent: Apr. 21, 2026

(54) OPERATION METHODS, MEMORY SYSTEMS, SYSTEM AND READABLE STORAGE MEDIA

(71) Applicant: Yangtze Memory Technologies Co., Ltd., Hubei (CN)

(72) Inventors: Wanqiang Tao, Hubei (CN); Hongwen Liu, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 256 days.

(21) Appl. No.: 18/472,984

(22) Filed: Sep. 22, 2023

(65) Prior Publication Data

US 2024/0385830 A1 Nov. 21, 2024

Related U.S. Application Data

(63) Continuation of application No. PCT/CN2023/094886, filed on May 17, 2023.

(51) Int. Cl.
*G06F 12/00* (2006.01)
*G06F 8/70* (2018.01)
*G06F 12/02* (2006.01)

(52) U.S. Cl.
CPC ............ *G06F 8/70* (2013.01); *G06F 12/0246* (2013.01)

(58) Field of Classification Search
CPC ........ G06F 8/70; G06F 12/0246; G06F 9/445; G06F 12/0868; G06F 2212/1016;
(Continued)

(56) References Cited

U.S. PATENT DOCUMENTS 7,093,239 B1* 8/2006 van der Made ...... G06F 21/562
717/135
7,861,303 B2* 12/2010 Kouznetsov .......... G06F 21/564
726/22
(Continued)

FOREIGN PATENT DOCUMENTS

CN 101277265 B 5/2011
CN 111666102 A 9/2020
(Continued)

OTHER PUBLICATIONS

International Searching Authority, "International Search Report," issued in connection with International Patent Application No. PCT/CN2023/094886, mailed on Jan. 17, 2024, 6 pages. [English language machine translation included.]
(Continued)

*Primary Examiner* — Mardochee Chery
(74) *Attorney, Agent, or Firm* — Hanley, Flight & Zimmerman, LLC

(57) ABSTRACT

Examples of the present disclosure discloses an operation method, a memory system, a system, and a readable storage medium. The memory system is capable of simultaneously upgrading at least one of multiple functions or versions of firmware. The memory system includes a communication interface configured to receive an executable file comprising: a file header and a plurality of pieces of executable code. Each of the plurality of pieces of executable code comprises code segment data and a code segment header. The code segment header is configured to indicate a memory location of the code segment data in the memory system. The indication of the memory location to correspond to the code segment data and simplifies firmware upgrade and supports simultaneous upgrade of at least one multiple functions or versions of the firmware.

20 Claims, 9 Drawing Sheets

100

(58) Field of Classification Search
CPC .... G06F 3/0659; G06F 8/65; G06F 2212/214;
G06F 2212/261; G06F 2212/312; G06F
2212/463; G06F 2212/466; G06F
2212/7201; G06F 2212/7208
USPC ......................................................... 711/167
See application file for complete search history.

(56) References Cited

U.S. PATENT DOCUMENTS

2006/0288019 A1    12/2006    Bauer et al.
2016/0132322 A1     5/2016    Jones et al.
2019/0026126 A1     1/2019    Liu et al.

FOREIGN PATENT DOCUMENTS

| | | |
|---|---|---|
| CN | 114185572 A | 3/2022 |
| CN | 115794188 A | 3/2023 |
| WO | 2019077607 A1 | 4/2019 |

OTHER PUBLICATIONS

International Searching Authority, "Written Opinion of the International Searching Authority," issued in connection with International Patent Application No. PCT/CN2023/094886, mailed on Jan. 17, 2024, 6 pages. [English language machine translation included.]
European Patent Office, "Extended European Search Report," issued in connection with European Patent Application No. 23923198.8-1207, mailed on Jul. 15, 2025, 30 pages.

* cited by examiner

100

Communication interface 610

Memory controller 620

Memory interface 630

Memory device 640

600

Executable file 700

Code segment header 720

Code segment header — 7101
Code segment data — 7102
Code segment header
Code segment data
.....
Code segment header
Code segment data

710

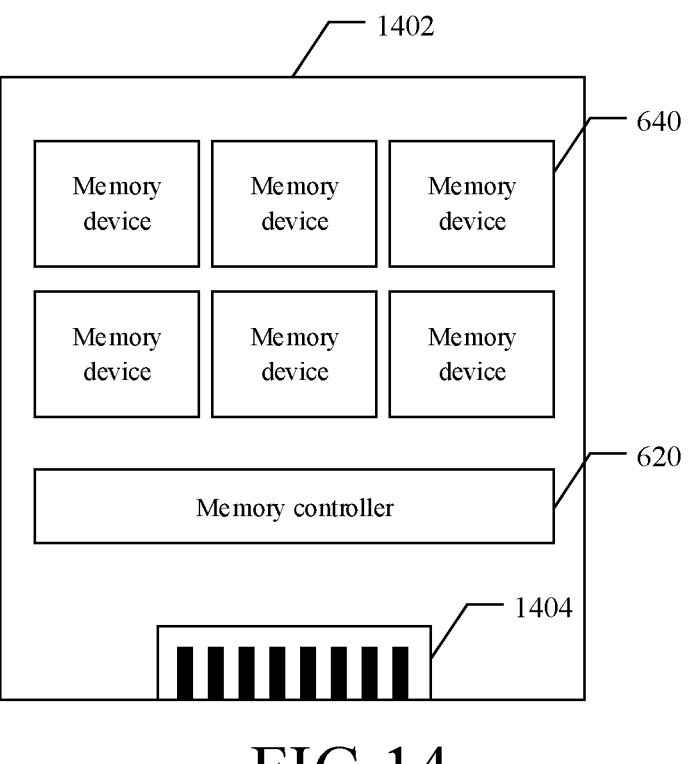

1402

640

Memory device    Memory device    Memory device

Memory device    Memory device    Memory device

Memory controller    620

Receiving an executable file in a set format via a communication interface of a memory system; wherein the executable file comprising: a file header and a plurality of pieces of executable code; each of the plurality of pieces of executable code comprising code segment data and a code segment header; and the code segment header being configured to indicate a memory location of the code segment data in the memory system

S1502 running a first handler; wherein the first handler performing the following when running:

parsing the executable file to obtain a plurality of pieces of the code segment data and the code segment header corresponding to each of the plurality of pieces of the code segment data contained in the executable file; and
    writing a corresponding piece of code segment data into a corresponding memory location according to each code segment header.

System 1600

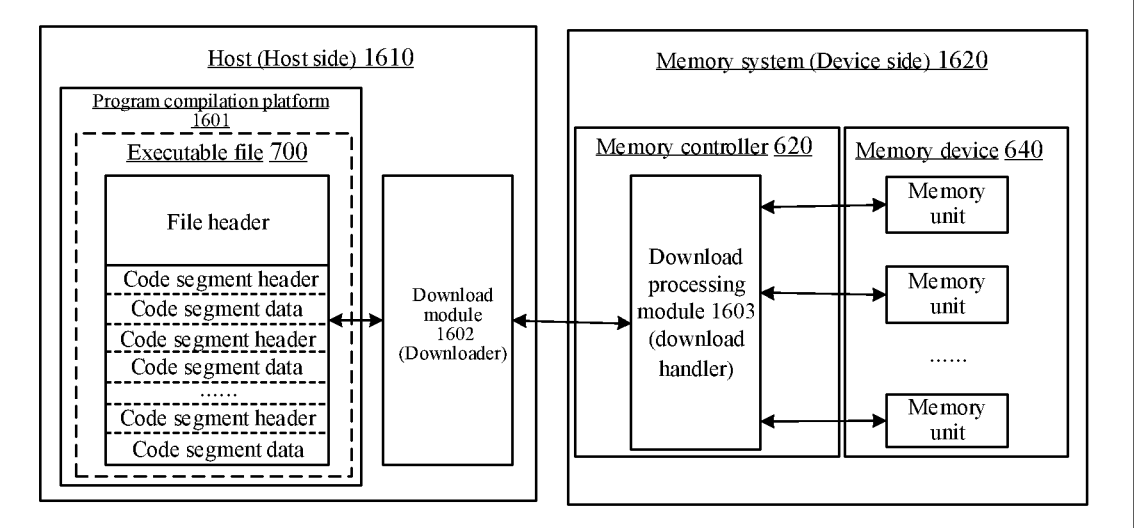

FIG.16

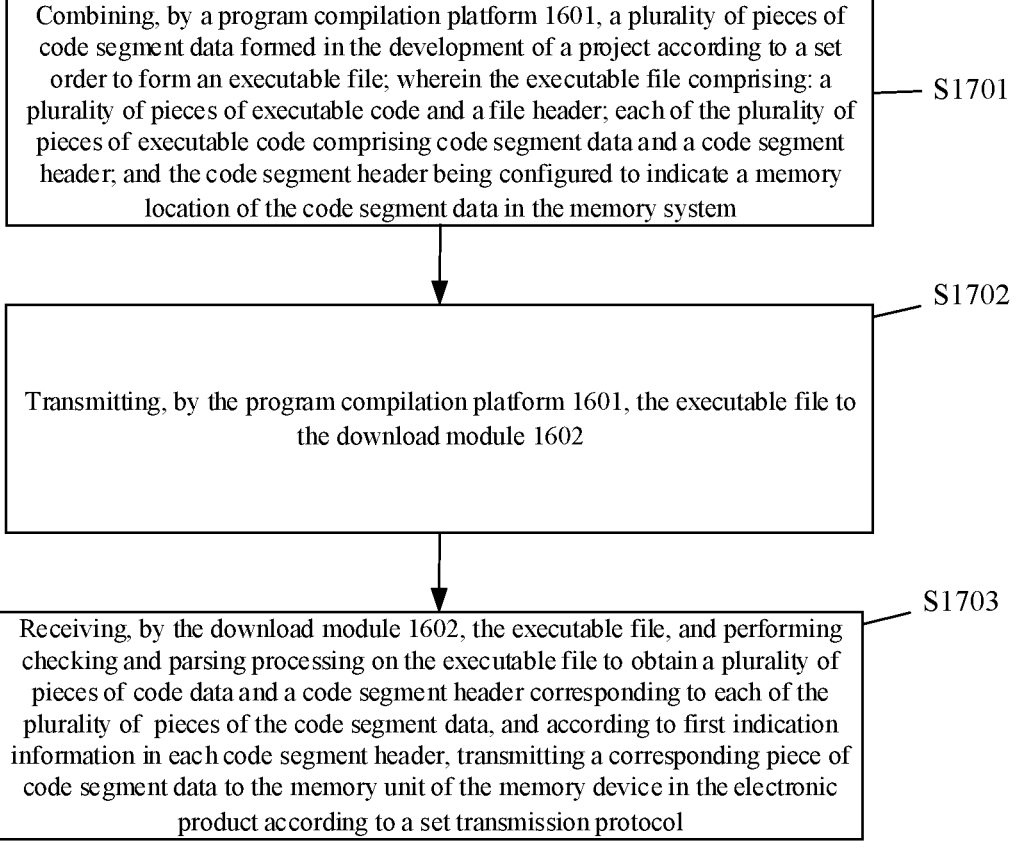

Combining, by a program compilation platform 1601, a plurality of pieces of code segment data formed in the development of a project according to a set order to form an executable file; wherein the executable file comprising: a plurality of pieces of executable code and a file header; each of the plurality of pieces of executable code comprising code segment data and a code segment header; and the code segment header being configured to indicate a memory location of the code segment data in the memory system — S1701

Transmitting, by the program compilation platform 1601, the executable file to the download module 1602 — S1702

Receiving, by the download module 1602, the executable file, and performing checking and parsing processing on the executable file to obtain a plurality of pieces of code data and a code segment header corresponding to each of the plurality of pieces of the code segment data, and according to first indication information in each code segment header, transmitting a corresponding piece of code segment data to the memory unit of the memory device in the electronic product according to a set transmission protocol — S1703

FIG.17

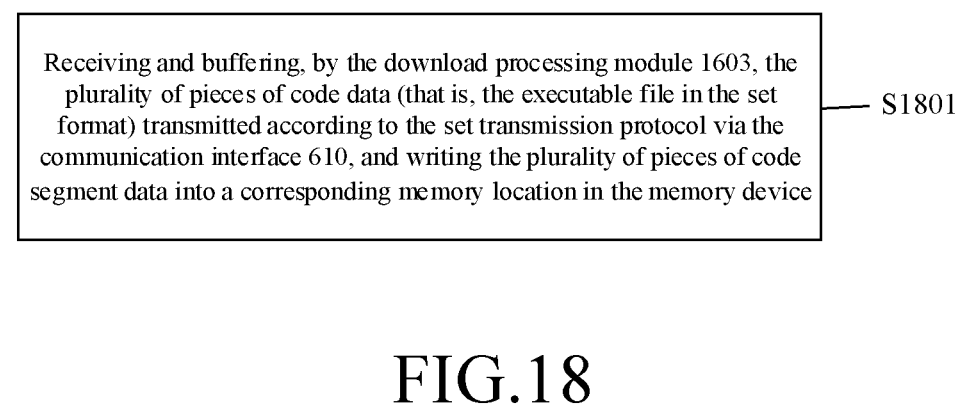

Receiving and buffering, by the download processing module 1603, the plurality of pieces of code data (that is, the executable file in the set format) transmitted according to the set transmission protocol via the communication interface 610, and writing the plurality of pieces of code segment data into a corresponding memory location in the memory device — S1801

FIG.18

OPERATION METHODS, MEMORY SYSTEMS, SYSTEM AND READABLE STORAGE MEDIA

CROSS REFERENCE TO RELATED APPLICATION

This application is a continuation of International Patent Application PCT/CN2023/094886, filed on May 17, 2023, which is hereby incorporated by reference in its entirety.

TECHNICAL FIELD

The present disclosure relates to the field of storage technologies, and in particular, to operation methods, memory systems, system and readable storage media.

BACKGROUND

With the development of electronic products, there is a wide variety of electronic products. Users also put forward higher requirements for the use scenarios and functions of electronic products, resulting in an increasing number of CPUs in electronic products. At present, the software development for electronic products has a large amount of code and many versions.

BRIEF DESCRIPTION OF THE DRAWINGS

In the drawings, which are not necessarily drawn to scale, like reference numerals may describe like components in the different views. The same number with a different letter suffix may indicate different instances of a like component. The drawings may illustrate various examples discussed in this document, by way of example and not limitation.

FIG. 14 shows a schematic structural diagram of an SSD according to an example of the present disclosure;

FIG. 15 shows a schematic flowchart of an operation method of a memory system according to an example of the present disclosure;

FIG. 16 shows a schematic structural diagram of a system according to an example of the present disclosure;

FIG. 17 shows a flowchart of host-side processing in the system shown in FIG. 16; and FIG. 18 shows a flowchart of electronic product-side processing in the system shown in FIG. 16.

DETAILED DESCRIPTION

Figure 1:
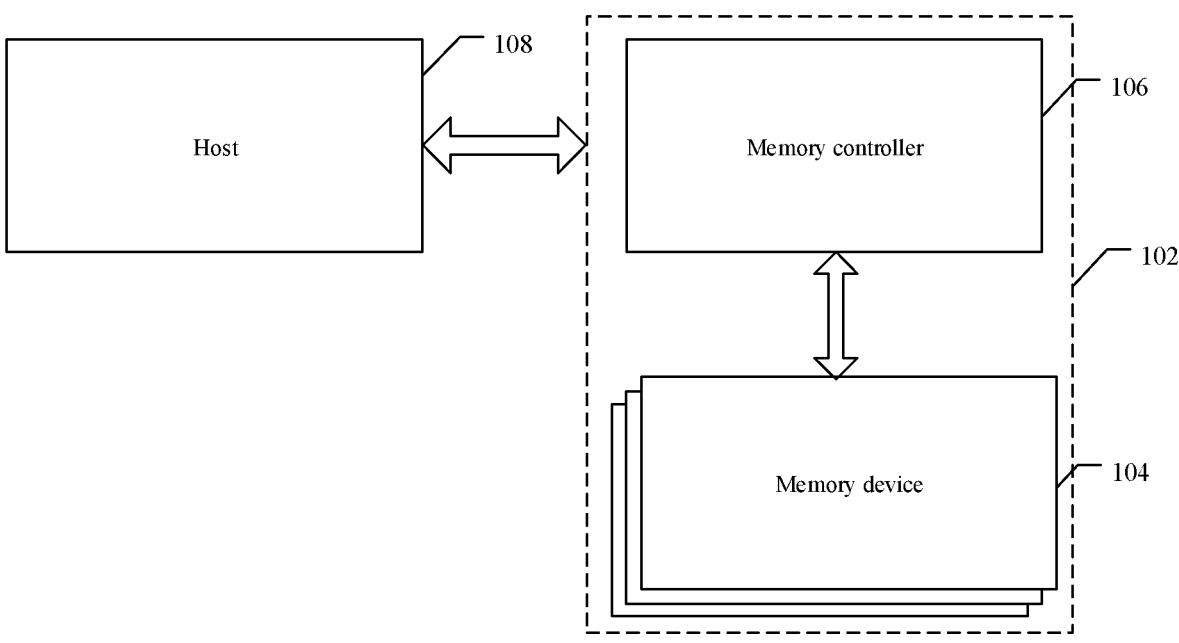
FIG. 1 shows a system block diagram of an electronic device with a memory system according to an example of the present disclosure.

Various examples of the present disclosure are described in more detail below with reference to the accompanying drawings. Other examples that are variations of any disclosed example can be formed by differently configuring or arranging elements and features of the disclosed examples. Therefore, examples of the present disclosure are not limited to the examples set forth herein. Rather, the described examples are provided so that the disclosed examples will be thorough and complete, and will fully convey the scope of the disclosed examples to those skilled in the art to which the disclosed examples pertain. It is noted that references to "an example," "another example," and the like do not necessarily mean only one example, and that different references to any such phrase are not necessarily to the same example. It should be understood that although the terms "first," "second," "third." and the like may be used herein to identify various elements, these elements should not be limited by these terms. These terms are used to distinguish between one element and another element having the same or similar name. Therefore, a first element in one example may also be referred to as a second or third element in another example without departing from the spirit and scope of the examples of the present disclosure.

The drawings are not necessarily drawn to scale, and in some instances, the scale may have been exaggerated to clearly illustrate features of the examples. When an element is referred to as being connected or coupled to another element, it should be understood that the former may be directly connected or coupled to the latter or electrically connected or coupled to the latter via one or more intervening elements therebetween. In addition, it will also be understood that when an element is referred to as being "between" two elements, it can be the only element between the two elements, or one or more intervening elements may also be present.

The terminology used herein is for the purpose of describing particular examples only and is not to be taken as a limitation of the present disclosure. As used herein, singular forms are intended to include plural forms unless the context clearly dictates otherwise. Unless otherwise stated or clearly understood as a singular form from the context, at least one of the articles "a" or "an" used in the examples of the present disclosure and the appended claims shall be collectively interpreted as meaning "one or more". It should be further understood that the terms "comprise", "comprising", "include" and "including" used in the examples of the present disclosure specify the presence of stated elements and do not exclude the presence or addition of one or more other elements. The term "at least one of . . . or . . . " used in the examples of the present disclosure includes any and all combinations of one or more of the associated listed items. Unless otherwise defined, all terms including technical and scientific terms used in the examples of the present disclosure have the same meanings as commonly understood by one of ordinary skill in the art to which the present disclosure belongs in view of the examples of the present disclosure. It should be further understood that, unless clearly defined by the examples of the present disclosure, terms such as those defined in commonly used dictionaries should be interpreted as having meanings consistent with their meanings in the context of the examples of the present disclosure and related technologies, and should not be interpreted in an idealized or overly formalized way.

In the following description, numerous specific details are set forth in order to provide a thorough understanding of the disclosure, and the disclosure may be practiced without some or all of these specific details. In other instances, at least one of well-known processing structures or processes have not been described in detail so as not to obscure the present disclosure. It should also be understood that in some cases, a feature or element described with respect to one example may be used alone or in combination with other features or elements of another example, unless otherwise specified, as would be apparent to a person skilled in the relevant art. Hereinafter, various examples of the present disclosure are described in detail with reference to the accompanying drawings. The following description focuses on details to facilitate understanding of examples of the present disclosure. Well-known technical details may be omitted so as not to obscure the features and aspects of the examples of the present disclosure.

The examples of the present disclosure will be further described in detail below in conjunction with the accompanying drawings and specific examples.

How to efficiently and conveniently download the required code from the upper computer (host) side to the electronic product for the firmware upgrade of electronic products has been a concern for the development of electronic products.

FIG. 1 shows a block diagram of a system of example electronic devices with a memory system. In FIG. 1, the electronic device may be a mobile phone, a desktop computer, a laptop computer, a tablet computer, a vehicle computer, a game console, a printer, a positioning device, wearable electronics, a smart sensor, a Virtual Reality (VR) device, an Augmented Reality (AR) device, or any other suitable electronic device with electronic products therein. As shown in FIG. 1, the system 100 is a system in an electronic device, which may include a host 108 and a memory system 102. The host 108 may include a processor, such as a Central Processing Unit (CPU) or a System of Chip (SoC), where the system on chip may be, for example, an Application Processor (AP). The host 108 includes further at least one Operating System (OS) that can manage and control the functions and operations performed in the host 108. The OS may enable interoperability between a host 108 coupled to the memory system 102 and users who need and use the memory system 102. The OS may support functions and operations corresponding to the user's request. For example, without limitation, depending on whether the type of the host 108 is a removable host, the OS may be classified into a general-purpose operating system and a mobile operating system. The general-purpose operating system can include personal operating systems, which is an operating system that can include Windows and Chrome for general purpose and support services, and enterprise operating systems, which is an operating system that can include Windows Server, Linux, Unix, and the like designed to ensure and support higher performance. The mobile operating system may refer to an operating system for mobility services or functions (e.g., power saving function). The mobile operating system may be an operating system such as Android, IOS, and Windows Mobile. In some examples, the host 108 may include multiple OSs, and correspondingly, the host 108 may run multiple operating systems related to the memory system 102. In other examples, the host 108 converts the user's request into one or more commands, and transmits the one or more commands to the memory system 102, so that the memory system 102 executes the operations related to the one or more commands.

The memory system 102 is capable of operating or performing a specific function or performing various internal operations in response to a request from the host 108. In some examples, memory system 102 is capable of storing data accessed by host 108. Memory system 102 can be used as primary or secondary storage for host 108. The memory system 102 and the host 108 can be electrically coupled and communicate according to corresponding protocols. The memory system 102 can be implemented and packaged into different types of end electronic products, including, but not limited to: Solid-State Drive (SSD), Multi-Media Card (MMC), Embedded MMC (eMMC), Reduced-Size MMC (RSMMC), Micro MMC, Secure Digital (SD) cards, Mini SD, Micro SD, Universal Serial Bus (USB) storage devices, Universal Flash Storage (UFS) devices, Compact Flash (CF) cards, Smart Media (SM) cards and memory stick and so on.

In some examples, memory system 102 may be further configured as part of, for example, computers, Ultra Mobile PCs (UMPCS), workstations, netbooks, Personal Digital Assistants (PDAS), portable computers, web tablets, tablet computers, wireless telephones, mobile phones, smart phones, e-books, Portable Multimedia Players (PMP), portable game consoles, navigation systems, black boxes, digital cameras, Digital Multimedia Broadcasting (DMB) players, 3-Dimensional (3D) televisions, smart televisions, digital audio recorders, digital audio players, digital picture recorders, digital picture players, digital video recorders, digital video players, storage devices equipped with data center, devices capable of transmitting and receiving information in a wireless environment, one of various electronic devices configured with home network, one of various electronic devices configured with a computer network, one of various electronic devices configured with a teleprocessing network, Radio Frequency Identification (RFID) devices, or one of the various components configured with a computing system.

Referring back to FIG. 1, the memory system 102 may include one or more memory devices 104 and a memory controller 106. The memory controller 106 can respond to the request of the host 108, and then control the memory device 104. For example, the memory controller 106 can read data from the memory device 104, and transmit the read data to the host 108. The memory controller 106 can also receive data from the host 108 data to be stored, and store the data to be stored into the memory device 104. That is, the memory controller 106 is capable of controlling write (or program) operations, read operations, erase operations, background operations, and the like of the memory device 104.

Figure 2:
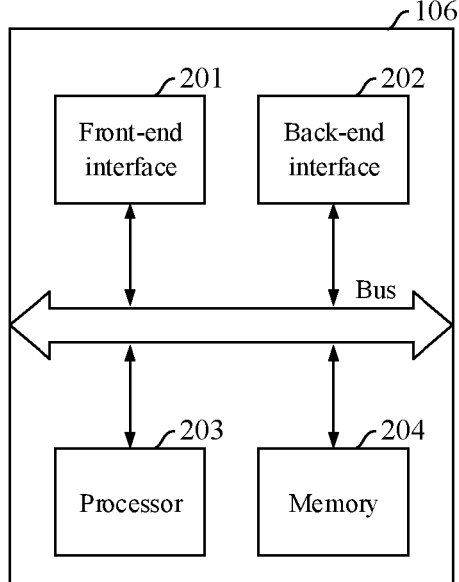
FIG. 2 shows a schematic structural diagram of a memory controller in a memory system according to an example of the present disclosure.

In some examples, as shown in FIG. 2, the memory controller 106 may include a front-end interface 201, a back-end interface 202, a processor 203, and a memory 204, where the above-mentioned components 201, 202, 203, and 204 in the memory controller 106 can share transmission signals inside the memory controller 106 via an internal bus. In some examples, the front-end interface 201 can interface the host 108 with the memory system 102 in response to the protocol of the host 108, and exchanges transmission commands and data operations between the host 108 and the memory system 102. The front-end interface 201 can process commands and data sent by the host 108, and may include at least one of the followings: Universal Serial Bus (USB), Multi-Media Card (MMC), Peripheral Component Interconnect Express (PCI-e or PCIe), Small Computer System Interface (SCSI), Serial SCSI (SAS), Serial Advanced Technology Attachment (SATA), Parallel Advanced Technology Attachment (PATA), Small Computer System Interface (SCSI), Enhanced Small Disk Interface (ESDI), and Integrated Drive Electronics (IDE). In some examples, the front-end interface 201 may be a component of the memory system 102 for exchanging data with the host 108 and may be implemented by firmware called a Host Interface Layer (HIL).

Back-end interface 202 may be an interface for commands and data communicated between the memory controller 106 and the memory device 104, allowing the memory controller 106 to control the memory device 104 in response to requests communicated from the host 108. The back-end interface 202 may generate control signals for controlling the memory device 104. In some examples, if the memory device 104 is a NAND flash memory, the back-end interface 202 can write data into the memory device 104 or read data from the memory device 104 under the control of the processor 203. The back-end interface 202 may handle commands and data between the memory controller 106 and the memory device 104, for example, operations of a NAND flash interface, especially between the memory controller 106 and the memory device 104. According to an example, the back-end interface 202 may be implemented as a component for exchanging data with the memory device 104 by the firmware called a Flash Interface Layer (FIL).

The processor 203 may be implemented by a microprocessor or a Central Processing Unit (CPU). Memory system 102 may include one or more processors 203. The processor 203 can control the overall operations of the memory system 102. By way of example and not limitation, the processor 203 may control program operations or read operations of the memory device 104 in response to a write request or a read request from the host 108. According to an example, the processor 203 may use or run firmware to control the overall operations of the memory system 102. In the present disclosure, the firmware may be referred to as a Flash Translation Layer (FTL). The FTL may operate as an interface between the host 108 and the memory device 104. The host 108 can transmit requests related to write operations and read operations to the memory device 104 via the FTL. For example, the memory controller 106 uses the processor 203 when performing an operation requested from the host 108 in the memory device 104. Processor 203 coupled to memory device 104 may process instructions or commands related to commands from the host 108. The memory controller 106 can perform a foreground operation such as a command operation corresponding to a command input from the host 108, for example, a program operation corresponding to a write command, a read operation corresponding to a read command, and an erase/discard operation corresponding to an erase/discard command, and a parameter setting operation corresponding to a set parameter command or a set feature command with a set command.

In another example, the memory controller 106 may perform background operations on the memory device 104 by the processor 203. By way of example and not limitation, these background operations include garbage collection (GC) operations, wear leveling (WL) operations, mapping cleanup operations, and bad block management operations that check or search for bad blocks. The garbage collection operations may include operations of copying and processing data stored in memory blocks in memory blocks MEMORY BLOCK<0, 1, 2 . . . > of memory device 104 (such as the memory device shown in FIG. 3) into another memory block. The wear leveling operations may include operations of exchanging and processing stored data among memory blocks MEMORY BLOCK<0, 1, 2, . . . > of the memory device 104. The mapping cleanup operations may include operations of storing mapping data stored in the memory controller 106 in memory blocks MEMORY BLOCK<0, 1, 2 . . . > of the memory device 104. The bad block management operations may include operations of checking and processing bad blocks in memory blocks MEMORY BLOCK<0, 1, 2 . . . > of the memory device 104. The memory controller 106 may respond to operations that access memory blocks MEMORY BLOCK<0, 1, 2 . . . > of the memory device 104. The operations that access memory blocks MEMORY BLOCK<0, 1, 2 . . . > of the memory device 104 may include foreground operations or background operations performed on memory blocks MEMORY BLOCK<0, 1, 2, . . . > of the memory device 104.

The memory 204 may be a working memory of the memory controller 106 and is configured to store data for driving the memory controller 106. In some examples, when the memory controller 106 controls the memory device 104 in response to a request from the host 108, the memory 204 can store firmware driven by the processor 203 and data (e.g., metadata) required to drive the firmware.

Memory 204 may also be a buffer memory of the memory controller 106 and is configured to temporarily store both write data transmitted from the host 108 to the memory device 104 and read data transmitted from the memory device 104 to the host 108. The memory 204 may include program memory, data memory, write buffer/cache, read buffer/cache, data buffer/cache, and mapping buffer/cache for storing write data and read data. The memory 204 may be implemented by using volatile memory. The memory 204 may be implemented by using Static Random Access Memory (SRAM), Dynamic Random Access Memory (DRAM), or both.

While FIG. 2 shows the memory 204 is included in the memory controller 106, the present disclosure is not limited thereto. In an example, the memory 204 may be included externally to the memory controller 106, and the memory controller 106 may input and output data to and from the memory 204 via a separate memory interface.

It is noted that although FIG. 2 shows that both the front-end interface 201 and the back-end interface 202 are included in the memory controller 106, the present disclosure is not limited thereto. In an example, at least one of the front-end interface 201 or the back-end interface 202 may be included externally to the memory controller 106. That is, the structure of the memory controller 106 is not limited to the structure shown in FIG. 2, and the components included therein may also be designed depending on actual conditions.

Memory device 104 may include a non-volatile memory device that retains data stored therein even when power is not supplied. The memory device 104 can store data provided from the host 108 by a write operation. Further, the memory device 104 can also provide the stored data to the host 108 by a read operation. In examples of the present disclosure, the memory device 104 may further include any of the memory disclosed, for example, at least one of volatile memory devices such as Dynamic Random Access Memory (DRAM) and Static RAM (SRAM), or non-volatile memory devices such as Read-Only Memory (ROM), Mask ROM (MROM), Programmable ROM (PROM), Erasable Programmable ROM (EPROM), Electrically Erasable Programmable ROM (EEPROM), Ferroelectric RAM (FRAM), Phase-Change RAM (PRAM), Magneto-resistive RAM (MRAM), Resistive RAM (RRAM or ReRAM), flash memory (such as three-dimensional NAND flash memory), and the like.

Figure 3:
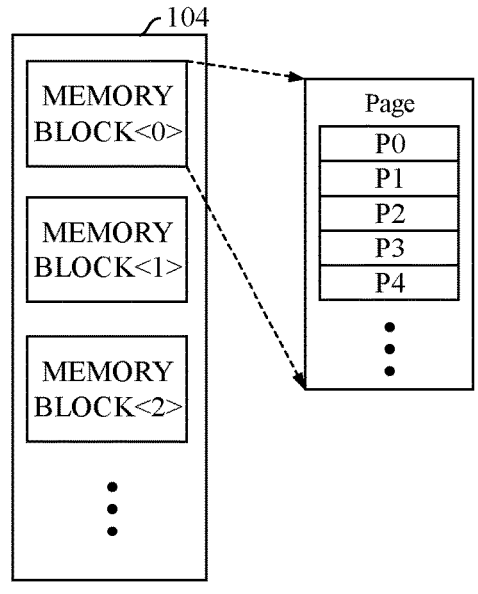
FIG. 3 shows a schematic structural diagram of a memory device in a memory system according to an example of the present disclosure.

As shown in FIG. 3, the memory device 104 may include a plurality of memory blocks MEMORY BLOCK<0, 1, 2, . . . >. Each of the memory blocks may include a plurality of pages P<0, 1, 2, 3, 4 . . . >. In addition, each of the pages P<0, 1, 2, 3, 4 . . . > may include a plurality of memory cells. Memory cells are classified into any of different types of memory blocks such as Single-Level Cell (SLC) memory blocks and Multi-Level Cell (MLC) memory blocks, depending on the number of bits that can be stored or represented in a single memory cell. Here, the SLC memory block includes a plurality of pages implemented by memory cells each store one bit of data. SLC memory blocks can have higher data I/O operation performance and higher endurance. An MLC memory block includes multiple pages implemented by memory cells each store multiple bits of data (e.g., two or more bits). Compared with SLC memory blocks, MLC memory blocks can have larger storage capacity for the same space. In terms of storage capacity, MLC memory blocks can be highly integrated. In an example, the memory device 104 may be implemented with MLC memory blocks such as MLC memory blocks, Trinary-Level Cell (TLC) memory blocks, Quad-Level Cell (QLC) memory blocks, and combinations thereof. An MLC memory block may include multiple pages implemented by memory cells each store 2 bits of data. A Trinary-Level Cell (TLC) memory block may include multiple pages implemented by memory cells each capable of storing 3 bits of data. A Quad-Level Cell (QLC) memory block may include multiple pages implemented by memory cells each capable of storing 4 bits of data. In other further examples, the memory device 104 may include memory blocks composed of memory cells each capable of storing 5 or more bits of data.

In actual applications, an electronic product integrated with the memory system 102 requires cooperation of the hardware system and the software system to realize data storage or reading. Among them, the hardware system of the electronic product may include the above-mentioned memory system 102 including hardware such as memory controller (including hardware such as processor, memory, front-end interface and back-end interface), memory device (the memory cell as shown in FIG. 3), etc. The hardware are the material basis and working environment for data storage.

An electronic product without any software is called a bare computer and cannot do any work, thus it must be configured with some necessary software to make it work. The collection of various software used by electronic products is called a software system. Software refers to the sum of all programs and data for operating, maintaining, managing and applying electronic products. The software of electronic products may include system software and application software. Among them, system software mainly functions to manage electronic products, maintain the operation of electronic products and certain functions, and perform services such as translation and loading of programs, including operating systems, programming language programs, and tool software (such as firmware), etc. Application software can refer to programs written to solve a certain problem, or programs designed for a certain application of the user. Here, the firmware is a software program in the electronic product, which can provide control of specific hardware and provide necessary instructions, such as the firmware of the FTL in the aforementioned memory system 102, so that the memory controller 106 can control some operations of the memory system 102, such as at least one of logical-to-physical (L2P) mapping, wear leveling, garbage collection, or bad block disposal. As another example, the aforementioned HIL firmware, FIL firmware, and so on may be used. In some examples, these firmware are stored in the electronic product. In some examples, the firmware are stored in the non-volatile storage medium of the memory device 104 of the memory system for subsequent use.

At present, with the development of electronic products integrated with memory systems, there are more and more types of electronic products. Users have increasing demands on the functions and application scenarios of electronic products, resulting in the number of cores of the Central Processing Unit (CPU) integrated in the processor contained in electronic products is increasing, and the CPU core is the core chip in the middle of the CPU, which is the data processing core and the most important part of the CPU. The CPU core is configured to perform all the functions such as calculating, receiving/storing commands, processing data, etc. The increase in the number of CPU cores enables the processing of more firmware in parallel, so as to realize the increase in the functions and application scenarios of the user commands for electronic products as above-mentioned. But in this case, in the software development of electronic products, the number of code contained in various firmware is also increasing. Moreover, when developing a certain project of an electronic product (which can be a function or a software design for an application scenario), an executable file (which can be presented as a binary BIN file) containing the data required by the firmware is often composed of different small files. In this case, when there are many small files, and when the above-mentioned executable files are downloaded to the electronic product through the upper computer (that is, the host), the downloader in the host needs to classify these small files, and too many small files (each small file may be designed by different designers) generated during project development are prone to version matching problems (programming languages or programming modes adopted by designers may be different). At the same time, during the project development, the basic operating program in the electronic product (the most basic program required to boot the electronic product and jump to the download handler), the download handler and the like may need to be modified synchronously due to different versions. As a result, it is prone to synchronization problems, which could consume more communication time. At present, two solutions are adopted to solve the above problems. The first one is to place most of the download processing of executable files on the electronic product side, and the host side is only responsible for the transfer of executable files by simple commands. In this way, electronic products need to process executable files to generate the data that Firmware (FW) in electronic products needs to use. In this way, the amount of data that electronic products need to process is relatively large, making the operation efficiency of electronic products side relatively low, and downloading handler needs to be more complex. The second one is to place most of the download processing of executable files on the host side, and use the operating efficiency of the host side to improve the download efficiency. In this way, one or more small files generated from the project are designed for certain functions of the electronic product. In other words, one or more small files are designed to be the running program in the electronic product to achieve a certain function. Then, some processing operations for processing the one or more small files to generate the firmware required by the electronic product need to be determined by the firmware required by the electronic product. If the download processing of the executable file is placed on the host side, the development between the downloader of the host and the firmware of the electronic product is strongly coupled.

Figure 4:
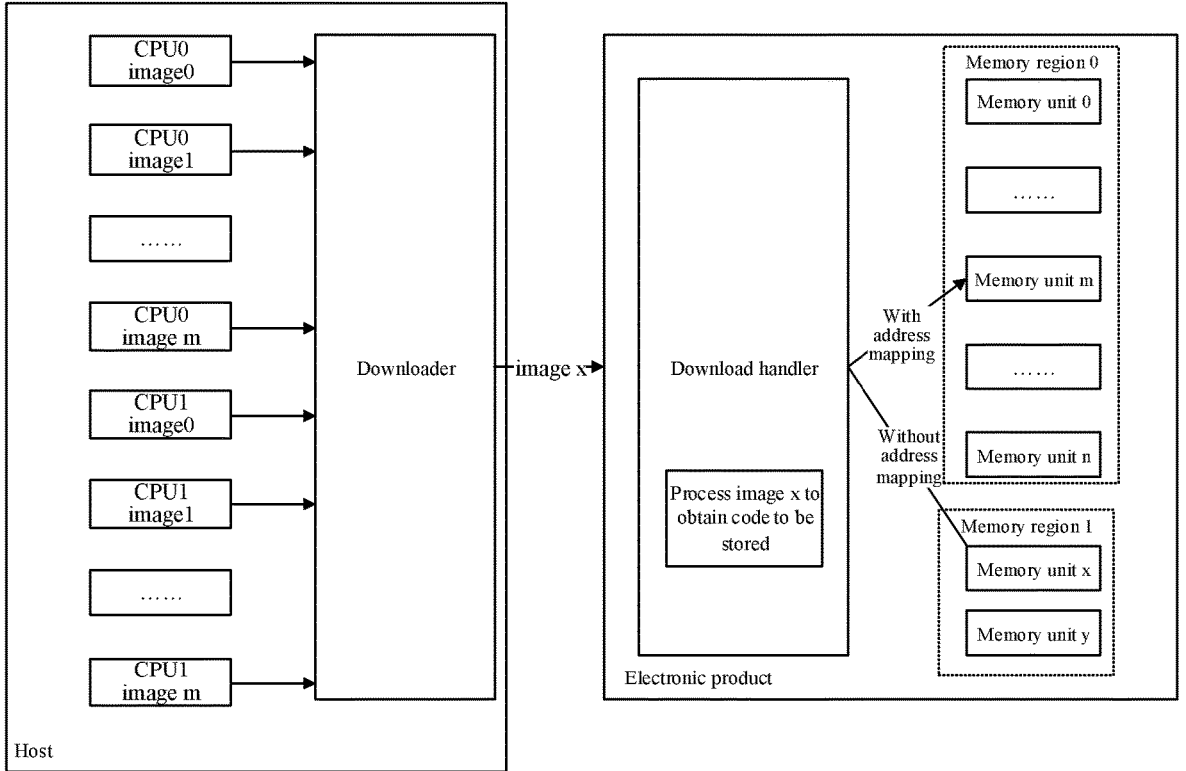
FIG. 4 shows a schematic flow diagram of an interaction between a downloader of a host and a download handler of an electronic product according to an example of the present disclosure.

For the aforementioned first solution, referring to FIG. 4 for the processing process. It is noted that CPU0 and CPU1 in FIG. 4 are two CPUs in the host. Image 0 to image m of different CPUs are small files included in the aforementioned executable file. Memory region 0 and memory region 1 are merely for convenience to represent two types of storage media (storage media in memory devices, such as NAND storage media, etc.). In some examples, memory region 0 represents storage media with address mapping. That is, the download handler of the electronic product stores the code to be stored in the corresponding memory unit based on a logical address of the code to be stored and the mapping relationship between the logical address and a physical address (the address of (physical memory unit or) memory cell 0 to memory cell n). The memory region 1 represents the storage medium without address mapping. That is, the download handler of the electronic product directly stores the code to be stored in the corresponding memory unit based on the physical address of the code to be stored. The memory region 0 and the memory region 1 may be in the same storage medium, or may be in different storage media. The number of memory units in each storage medium in FIG. 4 is merely an example representation, and does not imply a limit of the specific number.

Based on above, in the download processing relationship as shown in FIG. 4, the host performs only a simple transmission function (such as transmitting image x) to the electronic product, and most of the processing are carried out on the electronic product side (for example, the download handler processes image x, generates the code to be stored, and specifies the memory address of the code to be stored). As mentioned above, the memory address may be a logical address or a physical address. The download handler constructed according to the above download processing relationship reduces the operating efficiency of the electronic product. The code to be stored is related to the firmware required by the electronic product.

Figure 5:
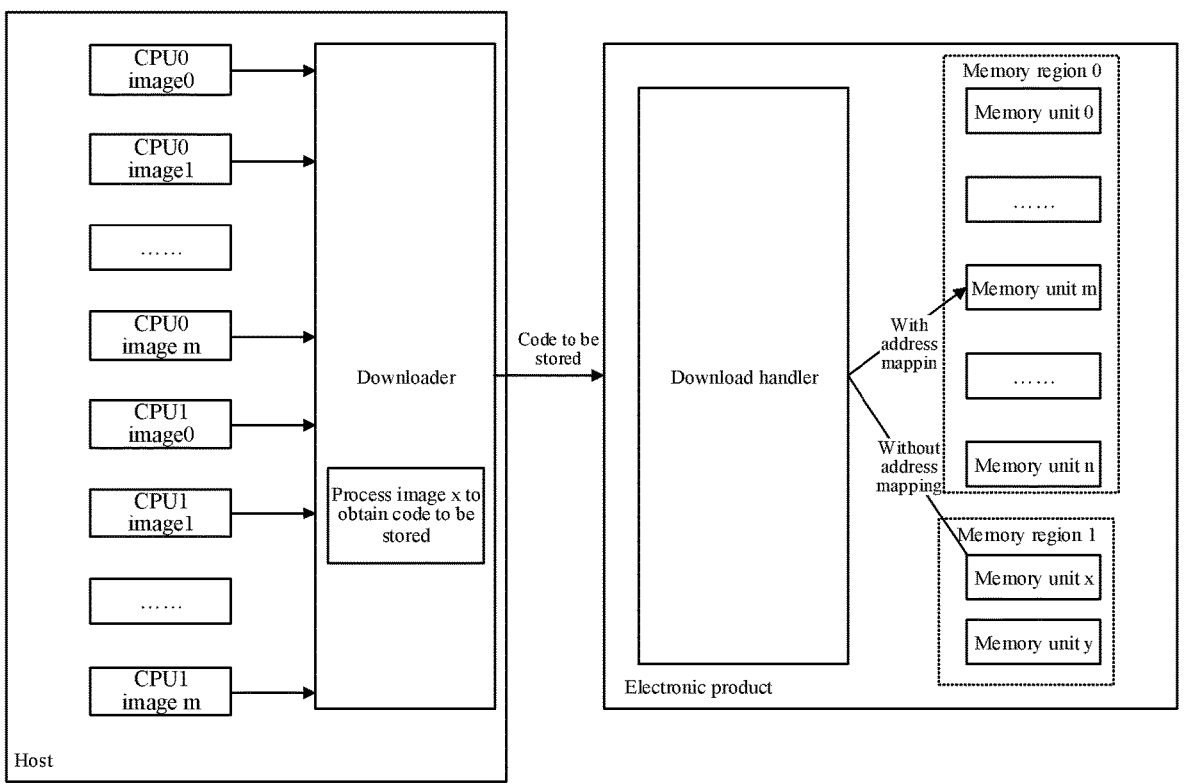
FIG. 5 shows another schematic flow diagram of an interaction between a downloader of a host and a download handler of an electronic product according to an example of the present disclosure.

For the second solution, referring to FIG. 5 for the processing process. It is noted that FIG. 5 is basically the same as FIG. 4, except that the processing of each small file shown in FIG. 5 is performed in the downloader as shown in FIG. 5. In this way, most of the download processing is carried out on the host side, and the development between the downloader of the host and the firmware of the electronic product is strongly coupled.

To solve the above technical problems, examples of the present disclosure provide a memory system capable of simultaneously upgrading at least one of multiple functions or versions of firmware, and for the upgrade of different types of memory systems, the portability of the download handler is better.

Figure 6:
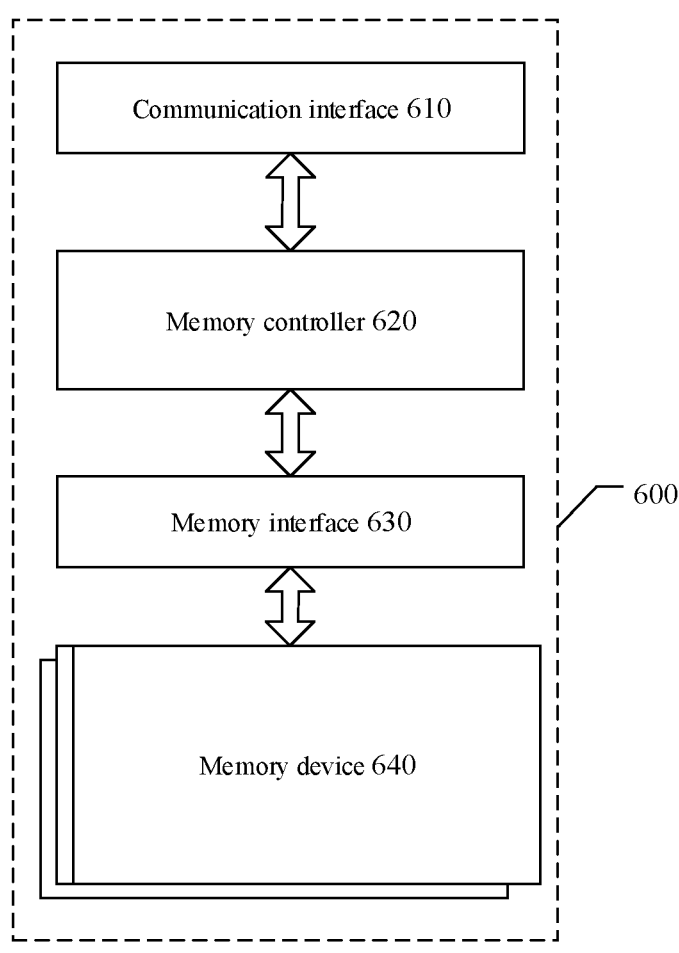
FIG. 6 shows a schematic structural diagram of a memory system according to an example of the present disclosure.

In some examples, as shown in FIG. 6, a memory system 600 provided by an example of the present disclosure may comprise:

a communication interface 610 configured to: receive an executable file in a set format; and wherein the executable file comprising: a file header and a plurality of pieces of executable code; each of the plurality of pieces of executable code comprising code segment data and a code segment header; and the code segment header being configured to indicate a memory location of the code segment data in the memory system 600.

It is noted that the communication interface 610 may serve as the aforementioned front-end interface 201. FIG. 2 shows that the front-end interface 201 is described inside the memory controller 106. Examples of the present disclosure describe the communication interface 610 as being external to the memory controller 620. This is a division method adopted only for the convenience of describing the technical solution of the present disclosure. In fact, regardless of whether the front-end interface 201 described in FIG. 2 is in the memory controller 106, or the communication interface 610 described in the technical solution of the present disclosure is external to the memory controller 620, the types and functions of the front-end interface 201 and the communication interface 610 are similar. In other words, the technical solutions of the present disclosure are not limited to the structures described in the present disclosure, and electronic products or memory systems with similar functions but different internal structural divisions are also applicable to the technical solutions of the present disclosure.

Here, the set format is related to the type of the communication interface 610. For example, if the communication interface 610 is an NVMe interface, the set format may be a format in which data to be transmitted is processed and encapsulated according to a vendor specific command in the NVMe transmission protocol. As another example, if the communication interface 610 is a USB interface, the set format may be a format in which the transmission data is processed and encapsulated according to the USB protocol.

Figure 7:
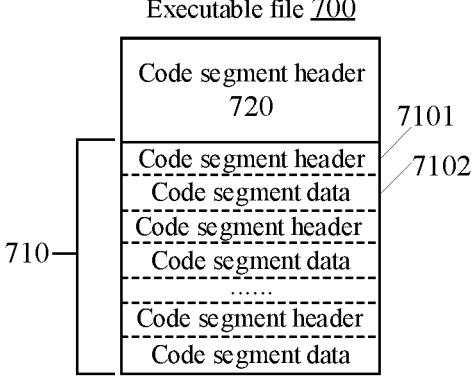
FIG. 7 shows a schematic structural diagram of an executable file according to an example of the present disclosure.

Here, the executable file may be a software program for upgrading the firmware of the memory system 600. The executable file 700, as shown in FIG. 7, includes: a file header 720 and a plurality of pieces of executable code 710, and each piece of executable code includes: code segment data 7101 and a code segment header 7102. The code segment data may include code of firmware required for upgrading the memory system. For example, the firmware may include FTL firmware, system firmware, and the like. The function of the code segment header is to indicate the memory location of the corresponding code segment data in the memory system (e.g., in the memory device). That is, the memory controller 620 can obtain the code segment header by parsing the executable file of the set format, and then store the corresponding code segment data in the corresponding location of the memory system 600 according to the memory location indicated by the code segment header. The executable file provided by the examples of the present disclosure can simplify the firmware upgrade of the memory system, and support simultaneous upgrade of at least one of multiple functions or versions of firmware.

In the memory system 600 provided by the example of the present disclosure, the executable file received via the communication interface 610 includes a plurality of pieces of executable code, each piece of the executable code includes code segment data and a code segment header, and firmware stored in different locations can be upgraded at the same time. In some examples, the executable file may be a binary BIN format file. That is to say, each piece of the executable code may also be a binary BIN format file.

Figure 8:
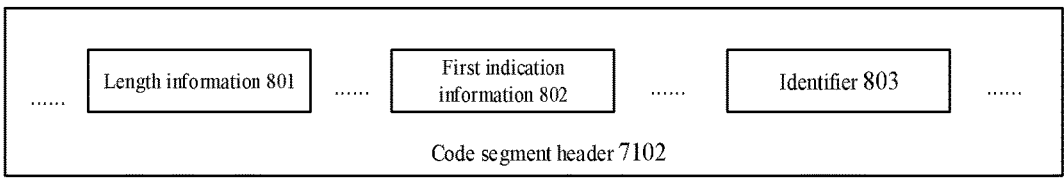
FIG. 8 shows a schematic structural diagram of a code segment header according to an example of the present disclosure.

In some examples, as shown in FIG. 8, the code segment header 7102 may include at least: length information 801 of the code segment data and first indication information 802 of the memory location.

It is noted that the length information herein is configured to calculate the storage space required by the corresponding code segment data. In some examples, a bit is the smallest unit for storing information. Since the code segment data is a BIN format file, the occupied storage space required by the code segment data can be calculated according to the length information of the code segment data (that is, contains multiple bits of data).

Here, the first indication information may include an address number of a memory area corresponding to the memory location; the memory area may include one or more minimum management units; and the minimum management unit may be a memory page or data partition.

It is noted that since the first indication information indicates the memory location, it should include the address number of the memory area where the code segment data is to be stored. The storage space occupied by the code segment data calculated according to the length information of the aforementioned code segment data may require one or more minimum management units. Then, the first indication information should include address number corresponding to the one or more minimum management units. For example, if the storage space occupied by a certain code segment data includes a minimum management unit, the first indication information includes the address number of the minimum management unit. As another example, if the storage space occupied by a certain code segment data contains three minimum management units, the first indication information should include the address numbers of the three minimum management units. If the three minimum management units are consecutive, an example of the first indication information may be address number A-address number C.

It is noted that the address number may be a logical address or a physical address corresponding to the one or more minimum management units.

In some examples, if the memory system can run the FTL firmware of the flash translation layer, translation from the logical address (LA) provided by the host (or user) to the physical address (PA) of memory cells of the memory device may be completed by FTL on the host side at this time, so as to write a piece of user's logic data into a memory cell corresponding to the physical address of the memory device or read the stored data in the memory cell corresponding to the physical address of the memory device. That is, the physical address of the memory device may be accessed through the logical address on the host side, so as to write data into or read data from the memory device. Based on this, the address number described in the present disclosure may refer to a logical address. When the address number corresponds to a logical address, the memory area where the code segment data is to be stored corresponds to the aforementioned memory cells in the memory region 0 as shown in FIG. 4 and FIG. 5.

In some other examples, if there is no FTL firmware in the memory system, the address number is the physical address at this time. At this point, the host directly stores the code segment data into the memory area to be stored through the provided physical address. At this time, the memory area to be stored corresponds to the aforementioned memory cells in the memory region 1 as shown in FIG. 4 and FIG. 5.

Based on the above description, the non-volatile storage medium in the memory device may be divided according to, for example, but not limited to, memory pages or data partitions to form minimum management units.

In some examples, the memory page may refer to a logical page or a physical page, and the storage space occupied by the aforementioned code segment data is measured in terms of pages, namely, how many logical pages or physical pages a code segment data needs to occupy when being stored. In some examples, if the electronic product can directly operate the memory device in the memory system included therein, the non-volatile storage medium included in the memory device in the memory system can be divided according to pages to form the minimum management units. Such an electronic product may be a storage device such as the aforementioned SSD, UFS, or the like. The memory regions of the memory devices included in such electronic products can also be divided into two types: memory region 0 and memory region 1.

Partition may be referred as data fragment or data slicing. In a narrow sense, it can refer to the process of dividing a large table into smaller slices in the memory system, and the divided data blocks will be distributed among multiple servers. The data partition page in a broad sense includes data computing partition for routing requests to different servers for data processing. In the example of the present disclosure, if the electronic product cannot directly operate the memory device of the memory system included therein, the non-volatile storage medium included in the memory device in the memory system may be divided according to partitions to form minimum management units. Such electronic products may be embedded electronic products such as mobile phones and tablets. The memory regions of the memory devices included in such electronic products can also be divided into two types: memory region 0 and memory region 1.

Figure 9:
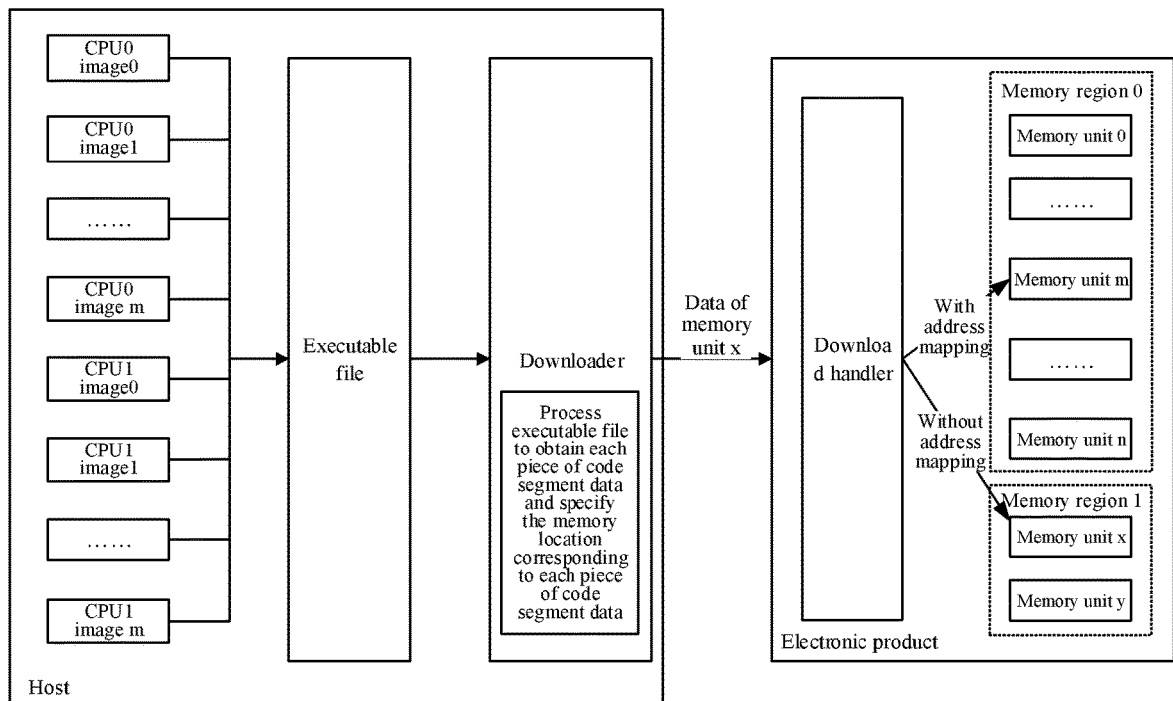
FIG. 9 shows a schematic flow diagram of an interaction between a downloader of a host and a download handler of an electronic product according to an example of the present disclosure.
Figure 10:
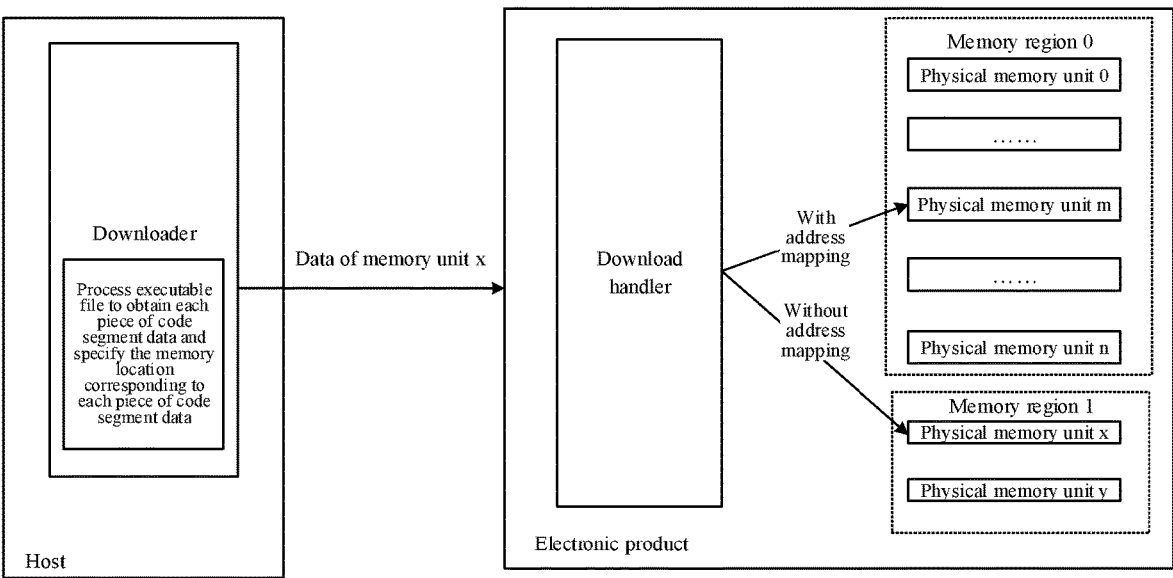
FIG. 10 shows a schematic flow diagram of the interaction between a downloader of a host and a download handler of an electronic product when the electronic product can directly operate on the memory device in the memory system included therein according to an example of the present disclosure.
Figure 11:
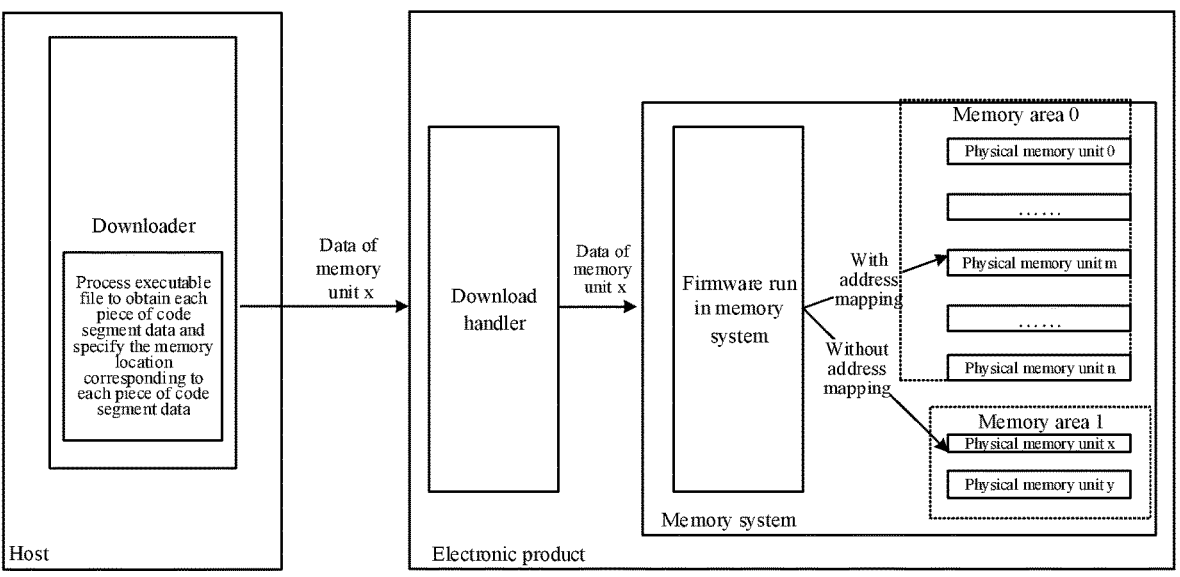
FIG. 11 shows a schematic flow diagram of the interaction between a downloader of a host and a download handler of an electronic product when the electronic product cannot directly operate on the memory device in the memory system included therein according to an example of the present disclosure.

To understand the above description, reference may be made to FIGS. 9 to 11. FIG. 9 shows a schematic flow diagram of downloading and downloading processing of executable files according to an example of the present disclosure. FIG. 10 shows a schematic flow diagram of the interaction between the downloader of the host and the download handler of the electronic product for the executable file, when the electronic product can directly operate the memory system included therein, according to an example of the present disclosure. FIG. 11 shows a schematic flow diagram of the interaction between the downloader of the host and the download handler of the electronic product for the executable file, when the electronic product cannot directly operate the memory system included therein, according to an example of the present disclosure.

In some examples, referring to the process shown in FIG. 9, the examples of the present disclosure combine many small files according to certain regulations based on the technical problems existing in the related art to form executable files of the present disclosure described in connection with FIGS. 6 to 8. Moreover, the executable file is processed by the download handler to obtain each piece of code data contained in the executable file and specify the memory location corresponding to each piece of code data. Electronic products store the code segment data to be stored in a corresponding location based on only the address number of the memory area corresponding to the transmitted memory location.

When electronic products store the code segment data, the storage process may be slightly different due to different types of electronic products. See FIGS. 10 and 11 for details.

The flow shown in FIG. 10 is a schematic flow diagram of storing code segment data when the electronic product can directly operate the memory device in the memory system included therein. That is, the download handler can directly store the code segment data to be stored based on the received address number. The electronic product shown in FIG. 10 may be, but not limited to, storage devices such as SSD and UFS.

The flow shown in FIG. 11 is a schematic flow diagram of storing code segment data when the electronic product cannot directly operate the memory device in the memory system included therein. That is, the download handler cannot directly store the code segment data to be stored based on the received address number. Instead, the code segment data to be stored needs to be relayed by the firmware running in the memory system, and then can be stored. The electronic products shown in FIG. 11 may be, but not limited to, embedded electronic products such as mobile phones and tablets.

It is noted that, regardless of the electronic products shown in FIG. 10 and FIG. 11 above, there are two ways to store the code segment data to be stored, one is based on the storage mode with address mapping (the corresponding memory system has FTL firmware), and the other is based on the storage mode without address mapping (the corresponding memory system has no FTL firmware).

It is noted that, no matter how the non-volatile storage medium in the memory system is divided, the central idea of the examples of the present disclosure is how to download the firmware compiled in the upper computer to the memory system and store it in the appropriate location. Therefore, the division of the non-volatile storage medium in the memory system is set forth in the two ways as described above.

In some examples, as shown in FIG. 8, the code segment header 7102 further includes: an identifier 803 configured to indicate a specific use of the code segment data.

It is noted that the identifier may indicate a specific use of the corresponding code segment data or some other instructions.

In a possible example, the identifier is an identifier for distinguishing between different firmware slots.

That is, the identifier may be a label of a firmware slot to distinguish between the code data segments belong to different firmware slots. The memory device can support several different firmware versions under the NVMe transmission protocol, and each firmware version corresponds to a firmware slot. In other words, the above executable file includes a plurality of pieces of code segment data, that is, a plurality of firmware. These firmware can belong to the same version or to different versions.

That is, the firmware slots to which the code segment data in the plurality of pieces of executable code belong include one of the following: completely identical, partially identical, and completely different.

Namely, in the memory system provided by the examples of the present disclosure, the received executable file can simultaneously upgrade the firmware of multiple functions in the same version, and can also upgrade different functions in different versions at the same time, which is more flexible and simpler.

Figure 12:
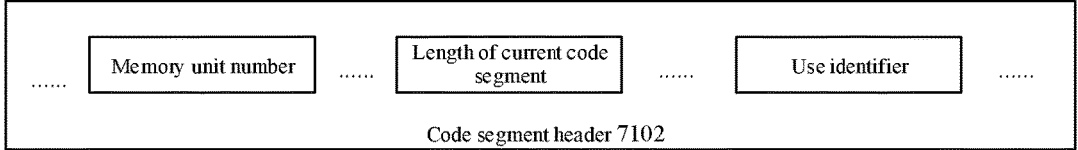
FIG. 12 shows another schematic structural diagram of a code segment header according to an example of the present disclosure.

It is noted that, the order of locations of information (length information, first indication information, identifier, etc.) in the code segment header includes but not limited to the structure as shown in FIG. 8. An example structure that can be implemented is shown in FIG. 12. The memory unit number in FIG. 12 is another way of expressing the address number contained in the aforementioned first indication information. The length of the current code segment refers to the length information of the corresponding code segment data. Usage identifier refers to a specific example of the aforementioned identifier 803 as shown in FIG. 8.

In some examples, as shown in FIG. 7, the file header 720 includes at least check information, which is configured to check whether the plurality of pieces of executable code are received or sent completely.

It is noted that the check information is configured to: check whether the plurality of pieces of executable code in the executable file are completely transmitted upon being sent or received. In some examples, the check information is compared with the check data calculated from the plurality of pieces of executable code when the executable file is sent on the host side or received on the electronic product side, so as to determine whether the plurality of pieces of executable code are completely sent or received. In other words, when the executable file is formed on the host side, check calculations may be performed on the plurality of pieces of executable code according to a certain check algorithm by the check information to generate check data, and the check data may be encapsulated into the file header to form the check information for subsequent check. Afterwards, when the executable file is transmitted, check information in the file header is compared to the check data calculated when the transmission is completed to determine whether the plurality of pieces of executable code are transmitted completely, regardless of host-side check or electronic product-side check. The check methods adopted herein include but are not limited to: hash check, redundancy cyclic check (CRC), MD5 check and so on.

In some examples, the file header 720 further comprises second indication information; wherein the second indication information being configured to indicate a firmware slot to which each of the plurality of pieces of executable code belongs.

It is noted that the second indication information herein may include a firmware slot number corresponding to each of the plurality of pieces of executable code, so as to indicate the firmware slot to which the code segment data in the corresponding executable code belongs. The function of the second indication information is similar to that of the aforementioned identifier for distinguishing between firmware slots, except that the second indication information indicates the firmware slot to which each of a plurality of pieces of executable code in the entire executable file belongs. The identifier for distinguishing between the firmware slots only indicates the firmware slot to which the corresponding code segment data belongs.

It is noted that the file header 720 may further include version information of the executable file, and the version information is configured to check whether the version of each of the plurality of pieces of executable code matches the version of downloader on the host side or the download handler on the electronic product side. During actual applications, the file header 720 may include more contents, which may be designed according to the actual situations.

The contents contained in the file header when different electronic products and different firmware are upgraded may be different. To identify the content contained in the file header, it is agreed on the number of bytes occupied by each content in the file header and the offset of each content in the file header, and then the corresponding content is added in order. Then, the corresponding content may be identified in order.

It is noted that the above detailed introductions are intended to describe the contents that can be included in the executable file and the functions of each content. However, it should be understood that, depending on differences between designs of the downloader on the host side and the download handler on the electronic product side, the contents and formats of the executable file in the set format are not completely identical to those in the aforementioned executable file 700 during the transmission process.

For example, after receiving the executable file 700 generated by a program compilation platform, the downloader on the host side processes (for example, check, parse) the executable file 700 to obtain the plurality of pieces of executable code, and then, encapsulates and transmits each piece of executable code according to format of the vendor specific command of the NVMe transmission protocol. Therefore, the executable file received on the electronic product side only contains each piece of code segment data and a code segment header that is formed according to the format in the vendor specific command (different from the format in FIG. 8 or FIG. 12). Afterwards, the electronic product parses the received executable file according to the vendor specific command of the NVMe transmission protocol, and stores each code segment data in the memory location indicated by the code segment header. At this time, the complexity of the download handler corresponding to the electronic product side is reduced, and the operating efficiency on the electronic product side is improved.

As another example, after receiving the executable file 700 generated by the program compilation platform, the downloader of the host only packages the executable file according to the corresponding transmission protocol and transmits it to the electronic product side. At this time, the content and format of the executable file received by the electronic product side are consistent with those of the executable file generated on the host side. At this time, the downloader on the host side is simple, and the complexity of the download handler on the electronic product side increases.

In some examples, the memory system 600 may further include a memory controller 620 coupled to the communication interface and configured to buffer the executable file transmitted from the communication interface; parse the executable file to obtain a plurality of pieces of the code segment data and the code segment header corresponding to each of the plurality of pieces of the code segment data contained in the executable file; and write a corresponding piece of code segment data into a corresponding memory location according to each code segment header.

It is noted that a series of operations of the memory system after receiving the executable file are described herein. In some examples, the memory controller 620 buffers the executable file transmitted from the communication interface, and then parses the executable file to obtain a plurality of pieces of the code data and the code segment header corresponding to each of the plurality of pieces of the code segment data contained in the executable file, and then writes a corresponding piece of code segment data into a corresponding memory location according to each code segment header.

The way of parsing herein is related to the type of the communication interface, the downloader on the host side, and the download handler on the electronic product side.

In some examples, as described above, if the downloader on the host side processes (for example, checks and parses) the executable file to obtain the plurality of pieces of executable code, the parsing on the electronic product side is only related to the type of the communication interface at this time. For example, if the communication interface is an NVMe type interface, the transmitted data packet needs to be encapsulated according to the NVMe transmission protocol. Then, the data packet encapsulated according to the NVMe transmission protocol received on the receiving side (that is, the memory system side) needs to be decapsulated according to the NVMe transmission protocol accordingly to obtain the corresponding required data. That is, the executable file in the set format needs to be decapsulated according to the NVMe transmission protocol accordingly to obtain a plurality of pieces of code segment data and a code segment header corresponding to each code segment data. As another example, if the communication interface 610 is a USB type interface, the transmitted data packet needs to be encapsulated according to the USB transmission protocol. Then, the data packet encapsulated according to the USB transmission protocol received on the receiving side (that is, the memory system side) needs to be decapsulated according to the USB transmission protocol accordingly to obtain the corresponding required data. At this time, the executable file in the set format needs to be decapsulated according to the USB transmission protocol accordingly to obtain a plurality of pieces of code segment data and a code segment header corresponding to each code segment data. If the downloader on the host side only packs the executable file, the parsing process on the electronic product side needs to perform decapsulation first according to the transmission protocol supported by the communication interface 610 to obtain the executable file. After that, the executable file needs to be processed (for example, checked, parsed) to obtain a plurality of pieces of code segment data and a code segment header corresponding to each code segment data.

After obtaining the plurality of pieces of code segment data and the code segment header corresponding to each code segment data, the memory controller can store each of the plurality of pieces of code segment data according to the memory location indicated by the corresponding code segment header.

In some examples, the memory system 600 may further include: a memory interface 630 and one or more memory devices 640; wherein, the memory controller being coupled to the memory interface and being further configured to: generate one or more write commands according to each of the plurality of pieces of the code segment data and corresponding code segment header; and transmit the one or more write commands to the memory device via the memory interface; and the one or more memory devices being coupled to the memory interface and configured to: receive the one or more write commands via the memory interface; and in response to the one or more write commands, write each of the plurality of pieces of the code segment data into the memory location indicated by the corresponding code segment header in non-volatile storage medium in the memory device.

It is noted that the above process is a programming process on the electronic product side, that is, a process of writing data into a memory device. In some examples, the memory controller generates one or more write commands according to each of the plurality of pieces of the code segment data and corresponding code segment header, and then transmits the one or more write commands to the memory device via the memory interface 630. The memory device receives the one or more write commands via the memory interface 630, and in response to the one or more write commands, writes each of the plurality of pieces of the code segment data into the memory location indicated by the corresponding code segment header in non-volatile storage medium in the memory device.

The writing herein means the programming operation on the memory device. In some examples, the programming policy of the programming operation includes, but is not limited to Increment Stepped Pulse Programming (ISPP). The memory interface 630 also functions as the aforementioned back-end interface 202. FIG. 2 shows that the back-end interface is internal to the memory controller 106. Examples of the present disclosure describe the memory interface 630 as being external to the memory controller 620. This is only a division method used for convenience of describing the technical solution of the present disclosure. In fact, regardless of whether the back-end interface 202 described in FIG. 2 is inside the memory controller 620 or the memory interface 630 described in the technical solution of the present disclosure is external to the memory controller 106, the type and function of the back-end interface 202 and the memory interface 630 are similar. In other words, the technical solutions of the present disclosure are not limited to the structures described in the present disclosure, and electronic products or memory systems with similar functions but different internal structural divisions are also applicable to the technical solutions of the present disclosure.

In some examples, the memory device 640 includes a 3D NAND storage medium.

In some examples, the memory system is included in a memory card or SSD.

Figure 13:
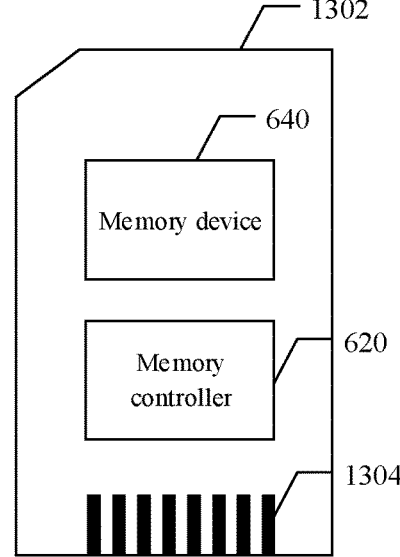
FIG. 13 shows a schematic structural diagram of a memory card according to an example of the present disclosure.

In some examples, as shown in FIG. 13 and FIG. 14, FIG. 13 shows a schematic structural diagram of a memory card according to an example of the present disclosure, and FIG. 14 shows a schematic structural diagram of an SSD according to an example of the present disclosure.

In FIG. 13, the memory controller 620 and a single memory device 640 may be integrated into a memory card 1302. Memory cards may include PC cards (PCMCIA, Personal Computer Memory Card International Association), CF cards, Smart Media (SM) cards, memory sticks, Multi-Media Cards (MMC, RS-MMC, MMCmicro), SD cards (SD, miniSD, microSD, SDHC), UFS, etc. The memory card may further include a memory card connector 1304 that couples the memory card with a host (e.g., host 108 in FIG. 1).

In FIG. 14, the memory controller 620 and multiple memory devices 640 may be integrated into a SSD 1402. The SSD may further include an SSD connector 904 that couples the SSD to a host (e.g., host 108 in FIG. 1). In some examples, at least one of the storage capacity or operating speed of the SSD is greater than that of the memory card. The SSD may further include an SSD connector 1404 that couples the SSD to a host (e.g., host 108 in FIG. 1).

The memory system provided by the examples of the present disclosure receives an executable file in a set format via a communication interface. The executable file includes a plurality of pieces of executable code, each piece of executable code includes code segment data and a code segment header, and each piece of code segment data corresponds to a firmware or a part of a firmware. Thus, a plurality of pieces of code data can be added into the same executable file to enable the function of upgrading multiple firmware at the same time. Moreover, the executable file can be processed by designing the downloader on the host side, and only the code segment data in the plurality of pieces of executable code included therein are transmitted to the electronic product side, so as to improve the operating efficiency of the electronic product side.

Examples of the present disclosure provide further an operation method of a memory system. In some examples, as shown in FIG. 15, the operation method may include: S1501: receiving an executable file in a set format via a communication interface of the memory system; wherein the executable file comprising: a file header and a plurality of pieces of executable code; each of the plurality of pieces of executable code comprising code segment data and a code segment header; and the code segment header being configured to indicate a memory location of the code segment data in the memory system; S1502: running a first handler; wherein the first handler performs the following operations when running: parsing the executable file to obtain a plurality of pieces of the code segment data and the code segment header corresponding to each of the plurality of pieces of the code segment data contained in the executable file; and writing a corresponding piece of code segment data into a corresponding memory location according to each code segment header.

It is noted that the first handler may refer to the download handler on the electronic product side described above. Namely, the first handler is a handler configured to process the received executable file and store a plurality of pieces of code segment data contained in the executable file into a corresponding memory location. The first handler herein may run in the memory controller 620. That is, the memory controller 620 stores each of the plurality of pieces of code segment data into a corresponding memory location by the first handler.

Here, the reception of the executable file by the memory system may be implemented by the first handler, or may not be implemented by the first handler. In the former case, the electronic product may enter an upgrade mode through certain settings. At this point, the executable file is received only when the first handler is running. In the latter case, when the electronic product is operated normally, the executable file can also be received normally, and the executable file is processed only when the first handler is running. The present disclosure may not limit the timings of receiving the executable file and running the first handler, and both may carried out according to the former case or the latter case, depending on the choice of the designer.

In an example, the executable file in the set format is received via the communication interface of the memory system. Afterwards, when the first handler is running, the operation can be as follows: parsing the executable file to obtain a plurality of pieces of the code segment data and the code segment header corresponding to each of the plurality of pieces of the code segment data contained in the executable file; and writing a corresponding piece of code segment data into a corresponding memory location according to each code segment header. The memory in the memory controller is instructed to cache the executable file while instructing the communication interface to receive the executable file in the set format, until the executable files is received completely.

In some examples, the operation method further includes: booting the memory system in response to a boot enable signal; and loading and running a second handler, wherein the second handler performing at least the following when running: loading the first handler, and causing the first handler to run.

It is noted that the second handler here may be the most basic running program of the memory system, which may include a boot program, an initialization program, and the like. The boot enable signal mentioned herein may refer to an electrical signal of a power supply, that is, powering on the memory system. The process described herein may include: after the electronic product is powered on, loading and running the second handler (basic operations such as a boot program, an initialization program, etc.), and at least the following operations are performed when the second handler is running: loading the first handler, that is, loading the download handler into the memory of the memory controller for subsequent use.

It is noted that, according to the foregoing description, the second handler may also execute a program for enabling the communication interface to receive the executable file. The operations executed by the two handlers in the above-mentioned operation method have been described in detail in the aforementioned memory system, and can be understood by reference, and will not be repeated herein.

Examples of the present disclosure also provide a system, which may include: the memory system of any one of the above; and a host coupled to the memory system and configured to control the memory system.

In some examples, the memory system is configured to: run a first handler; wherein the first handler performing the following operations when running: parsing the executable file to obtain a plurality of pieces of the code segment data and the code segment header corresponding to each of the plurality of pieces of the code segment data contained in the executable file; and writing a corresponding piece of code segment data into a corresponding memory location according to each code segment header.

In some examples, the memory system is further configured to: boot the memory system in response to a boot enable signal; and load and run a second handler, wherein the second handler performing at least the following when running: loading the first handler, and causing the first handler to run.

It is noted that the system herein may be included in the aforementioned electronic product, and its structure can be referred to the system block diagram shown in FIG. 1. Only structures related to the technical solutions of the present disclosure are described herein, and other structures can be understood with reference to the foregoing. The configuration of the memory system is the same as the description at different levels of the aforementioned operation method of the memory system. For the operations therein, reference may be made to the aforementioned operation method of the memory system, and details are not repeated here.

In some examples, the host is configured to: generate the executable file; perform conversion processing on the executable file to form the executable file in the set format; and transmit the executable file in the set format to the memory system.

The generating the executable file may include: combining the plurality of pieces of code segment data and the code segment header corresponding to each piece of code segment data in a set order to generate a plurality of pieces of executable code; generating file headers; and generating the executable file based on the plurality of pieces of executable code and the file headers.

It is noted that what is described here is processing on the host side. Among them, the plurality of pieces of code segment data and the code segment header corresponding to each piece of code segment data are combined according to the set order, and the generation of a plurality of pieces of executable code may be a simple combination of a plurality of small files (i.e., a plurality of pieces of code segment data) formed during the development of a project and the code segment header corresponding to these small files by the program compilation platform included in the host according to the set order to form the executable file. The set order is related to the writing order of the electronic product. For example, if the writing order of the electronic product is sequential writing, the set order may be that combination is performed in ascending order of the address number of the memory locations of each code segment data. As another example, if the writing order of the electronic product is random writing, the set order may be that each code segment data is combined in any order. The conversion processing of the executable file mentioned herein to form the executable file of the set format may refer to the processing process of the downloader on the host side. That is, it may include but not limited to: after receiving the executable file 700 generated by the program compilation platform, the downloader on the host side processes (for example, checks, parses) the executable file 700 to obtain the plurality of pieces of executable code, and then, encapsulates and transmits each piece of executable code according to the format of the vendor specific command of the NVMe transmission protocol. Therefore, the executable file received on the electronic product side contains only each piece of code segment data and code segment header that is formed according to the format in the vendor specific command (different from the format in FIG. 8 or FIG. 12). Afterwards, the electronic product parses the received executable file according to the vendor specific command of the NVMe transmission protocol, and stores each code segment data in the memory location indicated by the code segment header. At this time, the complexity of the download handler corresponding to the electronic product side is reduced, and the operating efficiency on the electronic product side is improved.

Examples of the present disclosure provide further a computer-readable storage medium having a computer program stored thereon. When the computer program is executed by a processor, the operations of any one of the methods described above are implemented. The aforementioned storage media include: various media capable of storing program code such as removable memory devices, Read-Only Memory (ROM), Random Access Memory (RAM), magnetic disk or optical disk.

For ease of understanding the technical solutions provided by the examples of the present disclosure, an example description will be given below in conjunction with the system shown in FIG. 16.

In FIG. 16, system 1600 includes: a host 1610 and a memory system 1620. The host 1610 includes: a program compilation platform 1601 and a download module (including downloader) 1602. The memory system 1620 includes: a communication interface 610 (arrow connected between the download module 1602 and the download handler 1603), a memory controller 620, a memory interface 630 (arrow connected between the download processing module 1603 and the memory unit) and a memory device 640. The memory controller 620 includes a download processing module (including a download handler) 1603. The memory device 640 includes a plurality of memory cells, which are volatile storage media and are divided into a plurality of minimum management units, and each minimum management unit corresponds to an address number. It is noted that the memory system 1620 shown in FIG. 16 is included in electronic products capable of directly operating memory devices. Such electronic products may be memory devices such as SSD and UFS.

Based on the above-mentioned structure of FIG. 16, as shown in FIG. 17, the operations performed on the host side may include: S1701: combining, by a program compilation platform 1601, a plurality of pieces of code segment data formed in the development of a project according to a set order to form an executable file; wherein the executable file comprising: a plurality of pieces of executable code and a file header; each of the plurality of pieces of executable code comprising code segment data and a code segment header; and the code segment header being configured to indicate a memory location of the code segment data in the memory system; S1702: transmitting, by the program compilation platform 1601, the executable file to the download module 1602; and S1703: receiving, by the download module 1602, the executable file, and performing checking and parsing processing on the executable file to obtain a plurality of pieces of code data and a code segment header corresponding to each of the plurality of pieces of the code segment data, and according to first indication information in each code segment header, transmitting a corresponding piece of code segment data to the memory unit of the memory device in the electronic product according to a set transmission protocol.

It is noted that the set transmission protocol mentioned herein may include but not limited to the aforementioned NVMe transmission protocol or USB transmission protocol. The processing of the download module in operation S1703 as described above is just an example.

The above operations can be understood as: the downloader runs on the host side as a program of the upper computer. The file header of the executable file is mainly used as a logical reference for the downloader. The downloader refers to the check information contained in the file header, and then compares the check information to hash (or similar file check methods, including but not limited to md5, etc.) check data calculated by itself (downloader) on a plurality of pieces of executable code contained in the executable file, to check the correctness (or integrity) of a plurality of pieces of executable code in the executable file. The check information in the file header is the check data generated by the program compilation platform checking the plurality of pieces of executable code contained in the executable file according to the hash (or similar file check methods, including but not limited to md5, etc.) when generating the executable file. Here, the downloader can also use supplementary information (that is, the aforementioned second indication information) such as the firmware slot in the file header and the like, so as to facilitate the subsequent arrangement of each code segment data in the correct order of the firmware slot. The downloader can also implement the version matching check function to be performed on the firmware and the downloader according to the version information in the file header, which varies according to the example differences between products and firmware. Nevertheless, a fixed number of bytes is agreed upon, or alternatively the number of bytes occupied by the header information is specified at a specific location. Afterwards, the downloader transmits the resulting code segment data to the device side according to the set storage protocol such as vendor specific command of NVMe (there are differences according to the bus mode used for transmission, and it can also be a common USB package, etc.) and the like for used by download handlers running on the device side.

Based on the above-mentioned structure of FIG. 16, as shown in FIG. 18, the operations performed on the electronic product side may include: S1801: receiving and buffering, by the download processing module 1603, the plurality of pieces of code data (that is, the executable file in the set format) transmitted according to the set transmission protocol via the communication interface 610, and writing the plurality of pieces of code segment data into a corresponding memory location in the memory device.

In an actual implementation process, the above-mentioned execution flow on the electronic product side can be understood as: the download handler runs on the device side. The processing operations of the device include: after the device is powered on and boots from the ROM, the basic program (such as the initialization program) run by the device loads the download handler to the specific running address of the device and jumps from the ROM to run the download handler. The download handler mainly receives each piece of code segment data by using the vendor specific command of NVMe and the like (there are differences according to the bus mode used for transmission, and it can also be a common USB package, etc.) to, and saves it into the persistent storage media (non-volatile storage media) such as an NAND page, partition and the like of the electronic product.

In the current firmware upgrade mode, the logic of the download handler of electronic products becomes simple and universal. It only needs to modify the corresponding front-end bus interface and back-end storage operation interface for different devices, and the processing of intermediate logic changes and alters less.

The examples of the present disclosure provide a firmware upgrade method. On the host side, after the program compilation platform generates a plurality of pieces of firmware code (binary code segment data) required for the operation of each CPU contained in the electronic product, the plurality of pieces of firmware code are combined to form the final binary file (that is, executable file) of an electronic product. The final binary file includes a file header and a plurality of pieces of executable code. When the firmware is upgraded, the downloader on the host side performs an overall hash check (or CRC, etc.) on the plurality of pieces of the executable code according to the check information contained in the header of the final binary file, and compares the check information in the file header to the calculated check data to ensure the data integrity of the overall code data and code segment description information. In addition, in some examples, the file header can inform the downloader of the number of firmware slots the current file owns, the number of firmware slots actually provided by the electronic product, and other information for the application scenario of the product, such as the multi-firmware slot characteristic of the NVME device. At the same time, the total number of minimum management unit to be written may be informed based on the differences in the storage media in the memory devices of different electronic products, for example, the minimum management unit is in size of a page in NAND, or the minimum management unit is based on the number of partitions that the storage medium can be divided into. In some examples, the content in the file header can also inform the downloader which part of the code segment will be updated independently based on the provided binary file, according to the individual characteristics of the electronic product or other requirements during the download process. The downloader may also be informed of the address number of one or more minimum management units corresponding to the non-volatile storage medium of the electronic product where the current code segment is downloaded and the length of the current code segment, based on the contents in each code segment header (length information, first indication information, and identifier). The downloader can complete the data writing operation only according to the identification of the header, and achieve synchronization according to the relationship of the size of the final binary file in connection with the end of the current code segment or the number of code minimum management units of the header in some examples. In examples of the present disclosure, both the downloader and the final binary file are in units of the minimum management unit. In the download handler of an electronic product, it is enough to complete the basic initialization of the system, provide an interface function of the minimum management unit, drive in link mode, and carry out a small amount of other tasks that need to be implemented to simplify the development of download handlers. Moreover, because there is no limit on the number of code segment data, it is more suitable for the needs of different projects.

A widely applicable file format is provided in the present disclosure to add basic information in the final binary file (that is, executable file), for example, adding special identifiers such as the memory unit number, current code segment length, and usage identifier, for example, the label of the firewall slot and the like, at the head of each binary segment or other agreed positions. The file format has no limit on the length of the final binary file. The advantages lie in that the download process and the process of downloading handlers on the memory device side are simplified, thereby improving development efficiency, and reducing communication costs during development; the downloader can complete the data writing operation only according to the identification of the header, and achieve synchronization according to the relationship of the size of the final binary file in connection with the end of the current code segment or the number of code minimum management units of the header in some examples. Different firewall slots can be distinguished to meet different needs of products. There is no size limit on the length of the final binary file, and more scenarios can be applied if the format is consistent. It is convenient for products and developers to add or delete code.

It is noted that, in the several examples provided in the present disclosure, it should be understood that the disclosed devices and methods may be implemented in other ways. The device examples described above are merely illustrative. For example, the division of the units is only a logical function division. In actual examples, there may be other division methods, for example, multiple units or components being combined or integrated into another system, or some features being ignored or not executed. In addition, the coupling, or direct coupling, or communication connection between the components shown or discussed may be done via some interfaces, and the indirect coupling or communication connection of devices or units may be electrical, mechanical or other forms.

The units described above as separate components may or may not be physically separated, and the components displayed as units may or may not be physical units, that is, they may be located in one place or distributed across multiple network units. Part or all of the units can be selected according to actual needs to achieve the object of the solution of the present examples.

In addition, each functional unit in each examples of the present disclosure may be integrated into one processing unit, or each functional unit may be used as a single unit, or two or more functional units may be integrated into one unit. The above-mentioned integration unit can be realized in the form of hardware or in the form of hardware plus software functional units.

Those of ordinary skill in the art can understand that all or part of the operations to realize the above method examples can be completed by hardware related to program instructions, and the aforementioned program can be stored in a computer-readable storage medium. When the program is executed, the operations including the above-mentioned method examples are performed. The aforementioned storage media may include: various media capable of storing program code such as removable storage devices, Read-Only Memory (ROM), Random Access Memory (RAM), magnetic disks or optical disks, and the like.

Alternatively, if the above-mentioned integrated units of the present disclosure are realized in the form of software function modules and sold or used as independent products, they may also be stored in a computer-readable storage medium. Based on such understanding, the essence of the technical solutions of the examples of the present disclosure or the part that contributes to the prior art can be embodied in the form of a software product, which is stored in a storage medium and includes several instructions for enabling a computer device (which may be a personal computer, a server, or a network device, etc.) to perform all or part of the methods as described in various examples of the present disclosure. The aforementioned storage medium may include: various media capable of storing program code such as removable memory devices, ROM, RAM, magnetic disks or optical disks, and the like.

The present disclosure provides an operation method of a memory system, a memory system, a system, and a computer-readable storage medium.

The technical solution of the present disclosure is implemented as follows.

In a first aspect, an example of the present disclosure provides a memory system, comprising: a communication interface configured to: receive an executable file in a set format; and wherein the executable file comprising: a file header and a plurality of pieces of executable code; each of the plurality of pieces of executable code comprising code segment data and a code segment header; and the code segment header being configured to indicate a memory location of the code segment data in the memory system.

In some examples, the code segment header comprises at least: length information of the code segment data and first indication information of the memory location.

In some examples, the code segment header further comprises an identifier configured to indicate a specific use of the code segment data.

In some examples, the first indication information comprises an address number of a memory area corresponding to the memory location; wherein the memory area comprising one or more minimum management units; and the minimum management unit being a memory page or data partition.

In some examples, the identifier is configured to distinguish between different firmware slots.

In some examples, the file header comprises at least: check information; wherein the check information being configured to check whether the plurality of pieces of executable code are received or transmitted completely.

In some examples, the file header further comprises second indication information;

wherein the second indication information being configured to indicate a firmware slot to which each of the plurality of pieces of executable code belongs.

In some examples, the firmware slot to which the code segment data in the plurality of pieces executable code belongs comprises one of: completely identical, partially identical, and completely different.

In some examples, the executable file is a binary BIN format file.

In some examples, the memory system further comprises: a memory controller coupled to the communication interface and configured to: buffer the executable file transmitted from the communication interface; parse the executable file to obtain a plurality of pieces of the code segment data and the code segment header corresponding to each of the plurality of pieces of the code segment data contained in the executable file; and write a corresponding piece of code segment data into a corresponding memory location according to each code segment header.

In some examples, the memory system further includes: a memory interface and one or more memory devices; wherein, the memory controller being coupled to the memory interface and being further configured to: generate one or more write commands according to each of the plurality of pieces of the code segment data and corresponding code segment header; and transmit the one or more write commands to the memory device via the memory interface; and the one or more memory devices being coupled to the memory interface and being configured to: receive the one or more write commands via the memory interface; and in response to the one or more write commands, write each of the plurality of pieces of the code segment data into the memory location indicated by the corresponding code segment header in non-volatile storage medium in the memory device.

In some examples, the memory device comprises a 3D NAND storage medium.

In some examples, the memory system is comprised in a memory card or an SSD.

In a second aspect, an example of the present disclosure provides an operation method of a memory system, the operation method comprising: receiving an executable file in a set format via a communication interface of the memory system; wherein the executable file comprising: a file header and a plurality of pieces of executable code; each of the plurality of pieces of executable code comprising code segment data and a code segment header; and the code segment header being configured to indicate a memory location of the code segment data in the memory system; running a first handler; wherein the first handler performs the following when running: parsing the executable file to obtain a plurality of pieces of the code segment data and the code segment header corresponding to each of the plurality of pieces of the code segment data contained in the executable file; and writing a corresponding piece of code segment data into a corresponding memory location according to each code segment header.

In the above solution, wherein the operation method further comprises: booting the memory system in response to a boot enable signal; and loading and running a second handler, wherein the second handler performing at least the following when running: loading the first handler, and causing the first handler to run.

In a third aspect, an example of the present disclosure provides a computer-readable storage medium having a computer program stored thereon that, when executed by a processor, implements the operations of any one of the methods described above.

In a fourth aspect, an example of the present disclosure provides a system, comprising: the memory system of any one of the above; and a host coupled to the memory system and configured to control the memory system.

In the above solution, wherein the memory system is configured to: run a first handler; wherein the first handler performing the following when running: parsing the executable file to obtain a plurality of pieces of the code segment data and the code segment header corresponding to each of the plurality of pieces of the code segment data contained in the executable file; and writing a corresponding piece of code segment data into a corresponding memory location according to each code segment header.

In some examples, the memory system is further configured to: boot the memory system in response to a boot enable signal; and load and run a second handler, wherein the second handler performing at least the following when running: loading the first handler, and causing the first handler to run.

In some examples, the host is configured to: generate the executable file; perform conversion processing on the executable file to form the executable file in the set format; and transmit the executable file in the set format to the memory system.

Examples of the present disclosure provide an operation method of a memory system, a memory system, a system, and a computer-readable storage medium. Among them, the memory system comprises a communication interface configured to: receive an executable file in a set format; and wherein the executable file comprising: a file header and a plurality of pieces of executable code; each of the plurality of pieces of executable code comprising code segment data and a code segment header; and the code segment header being configured to indicate a memory location of the code segment data in the memory system. The memory system provided by the examples of the present disclosure provides a communication interface, wherein the communication interface receiving an executable file in a set format, and the executable file comprising a plurality of pieces of executable code, so as to store a plurality of pieces of code data segment at the same time. Moreover, each piece of the code data segment in the executable file corresponds to a code segment header to indicate a memory location of the corresponding code segment data, which enables the code of the required firmware to be downloaded from the upper computer (host) side to the electronic computer side efficiently and conveniently and to be quickly stored into the corresponding location.

The above description is intended to be illustrative and not restrictive.

What is claimed is:

1. A memory system comprising a communication interface configured to receive an executable file in a set format, wherein the executable file comprises:

a file header; and a plurality of pieces of executable code, wherein one of the plurality of pieces of executable code comprises:

first code segment data; and a code segment header configured to indicate a first memory location of the first code segment data in the memory system, wherein the first code segment data is transmitted to the first memory location to cause download of a first upgrade for the memory system, the first upgrade to correspond to the first memory location and a second upgrade from second code segment data to correspond to a second memory location, the first memory location different than the second memory location.

2. The memory system of claim 1, wherein the code segment header comprises at least:

length information of the first code segment data; and first indication information of the first memory location.

3. The memory system of claim 2, wherein the code segment header further comprises an identifier configured to indicate a specific use of the first code segment data.

4. The memory system of claim 2, wherein the first indication information comprises an address number of a memory area corresponding to the first memory location, wherein the memory area comprises one or more minimum management units, and the minimum management units being a memory page or data partition.

5. The memory system of claim 3, wherein the identifier is configured to distinguish between different firmware slots.

6. The memory system of claim 1, wherein the file header comprises check information configured to check whether the plurality of pieces of executable code are received or transmitted completely.

7. The memory system of claim 6, wherein the file header further comprises second indication information configured to indicate a firmware slot to which each of the plurality of pieces of executable code belongs.

8. The memory system of claim 7, wherein the firmware slot to which the first code segment data in the plurality of pieces of executable code belongs comprises one of:

completely identical;

partially identical; and completely different.

9. The memory system of claim 1, wherein the executable file is a binary (BIN) format file.

10. The memory system of claim 1, wherein the memory system further comprises a memory controller coupled to the communication interface and configured to:

buffer the executable file transmitted from the communication interface;

parse the executable file to obtain a plurality of pieces of code segment data and the code segment header corresponding to each of the plurality of pieces of code segment data contained in the executable file, the plurality of pieces of code segment data including the first code segment data and the second code segment data; and write a corresponding piece of code segment data into a corresponding memory location according to each code segment header.

11. The memory system of claim 10, wherein the memory system further comprises:

a memory interface, wherein the memory controller is coupled to the memory interface and is further configured to:

generate one or more write commands according to each of the plurality of pieces of code segment data and corresponding code segment header; and transmit the one or more write commands to a memory device via the memory interface; and one or more memory devices coupled to the memory interface and configured to:

receive the one or more write commands via the memory interface; and in response to the one or more write commands, write each of the plurality of pieces of code segment data into a memory location indicated by the corresponding code segment header in non-volatile storage medium in the memory device.

12. The memory system of claim 11, wherein the memory device comprises a 3D NAND storage medium.

13. The memory system of claim 1, wherein the memory system is comprised in a memory card or an SSD.

14. An operation method of a memory system, comprising:

receiving an executable file in a set format via a communication interface of the memory system, wherein the executable file comprises:

a file header; and a plurality of pieces of executable code, wherein one of the plurality of pieces of executable code comprises:

first code segment data; and a code segment header configured to indicate a first memory location of the first code segment data in the memory system; and running a first handler, wherein the first handler performs the following when running:

parsing the executable file to obtain a plurality of pieces of code segment data and the code segment header corresponding to each of the plurality of pieces of code segment data contained in the executable file, the plurality of pieces of code segment data including the first code segment data and second code segment data; and writing a corresponding piece of code segment data into a corresponding memory location according to each code segment header, wherein the first code segment data is transmitted to the first memory location to cause download of a first upgrade for the memory system, the first upgrade to correspond to the first memory location and a second upgrade from the second code segment data to correspond to a second memory location, the first memory location different than the second memory location.

15. The operation method of claim 14, wherein the operation method further comprises:

booting the memory system in response to a boot enable signal; and loading and running a second handler, wherein the second handler performs at least the following when running:

loading the first handler; and causing the first handler to run.

16. A system comprising:

a memory system, comprising:

a communication interface configured to receive an executable file in a set format, wherein the executable file comprises:

a file header; and a plurality of pieces of executable code, wherein one of the plurality of pieces of executable code comprises:

first code segment data; and a code segment header configured to indicate a first memory location of the first code segment data in the memory system, wherein the first code segment data is transmitted to the first memory location to cause download of a first upgrade for the memory system, the first upgrade to correspond to the first memory location and a second upgrade from second code segment data to correspond to a second memory location, the first memory location different than the second memory location; and a host coupled to the memory system and configured to control the memory system.

17. The system of claim 16, wherein the memory system is configured to run a first handler; wherein the first handler performs the following when running:

parsing the executable file to obtain a plurality of pieces of code segment data and the code segment header corresponding to each of the plurality of pieces of code segment data contained in the executable file, the plurality of pieces of code segment data including the first code segment data and the second code segment data; and writing a corresponding piece of code segment data into a corresponding memory location according to each code segment header.

18. The system of claim 17, wherein the memory system is further configured to:

boot the memory system in response to a boot enable signal; and load and run a second handler, wherein the second handler performs at least the following when running:

loading the first handler; and causing the first handler to run.

19. The system of claim 16, wherein the host is configured to:

generate the executable file;

perform conversion processing on the executable file to form the executable file into the set format; and transmit the executable file in the set format to the memory system.

20. The system of claim 16, wherein the memory system is comprised in a memory card or an SSD.

\* \* \* \* \*